United States Patent
Finley

[15] 3,686,706
[45] Aug. 29, 1972

[54] VEHICLE WINDSCREEN WIPING MECHANISMS

[72] Inventor: Gilbert Ralph Finley, Solihull, England

[73] Assignee: Joseph Lucas (Industries) Limited, Birmingham, England

[22] Filed: Dec. 18, 1969

[21] Appl. No.: 886,424

[30] Foreign Application Priority Data
Jan. 3, 1969    Great Britain..............537/69

[52] U.S. Cl. ..........15/250.16, 15/250.24, 15/250.26
[51] Int. Cl. ...............................................B60s 1/02
[58] Field of Search........15/250.16, 250.24, 250.25, 15/250.26, 250.27, 250.29, 250.3

[56] References Cited
UNITED STATES PATENTS
| | | | |
|---|---|---|---|
| 2,063,055 | 12/1936 | Shaw | 15/250.24 X |
| 3,078,494 | 2/1963 | Price | 15/250.26 X |
| 3,505,702 | 4/1970 | Omlie et al. | 15/250.24 X |

*Primary Examiner*—Peter Feldman
*Attorney*—Holman & Stern

[57] ABSTRACT

A mechanism for controlling the operating cycle of a wiper blade for cleaning a vehicle windscreen comprises a wiper arm mounted on a carrier, which is connected to a drive rod, or belt for linear reciprocation lengthwise of an edge of the windscreen to be cleaned, the carrier engaging guide means whereby, at one end of the movement, the carrier and arm are caused to move angularly.

7 Claims, 6 Drawing Figures

VEHICLE WINDSCREEN WIPING MECHANISMS

This invention relates to mechanisms for controlling the operating cycle of wiper blades for cleaning vehicle windscreens.

The object of the invention is to provide a mechanism for this purpose which enables maximum area of the glass screen to be cleaned.

According to the present invention a mechanism for controlling the operating cycle of a wiper blade for cleaning a vehicle windscreen comprises, a wiper blade carrier, means for moving the carrier substantially linearly with respect to one edge of the windscreen to be cleaned, and guide means whereby said linear movement is converted into angular movement of the blade carrier over a portion of the cycle.

Figure 1:
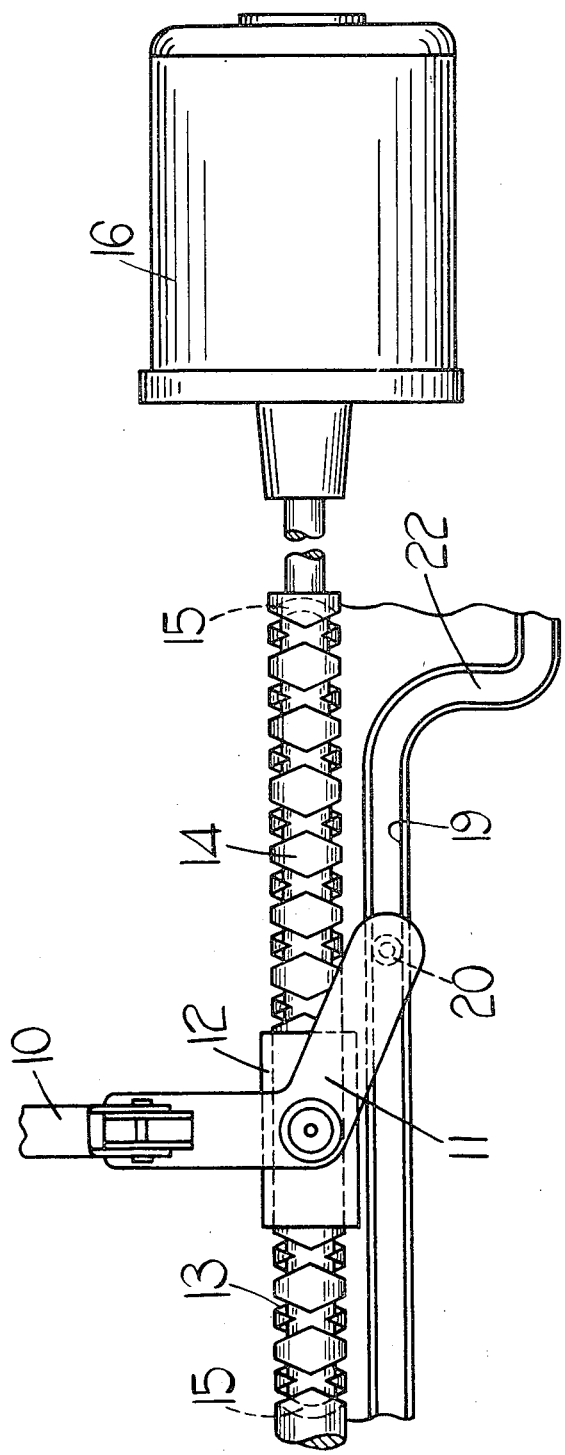
Figure 2:
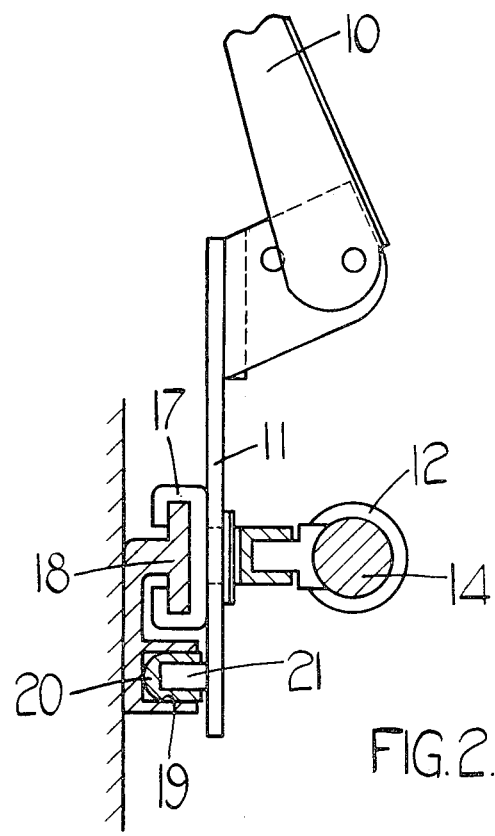
Figure 3:
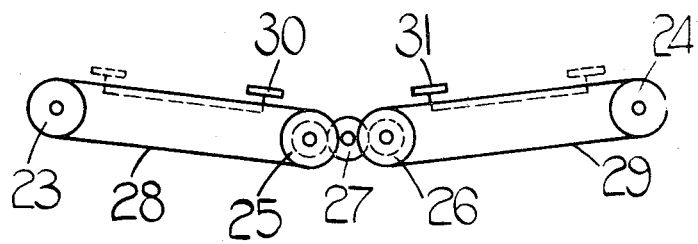
Figure 4:
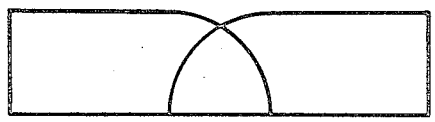
Figure 5:
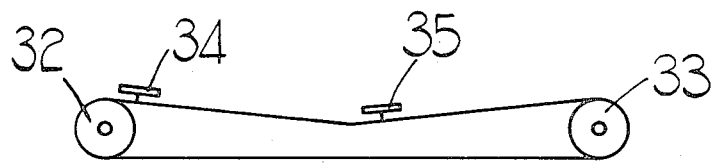
Figure 6:
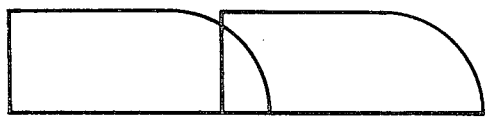

The invention will now be described by way of example with reference to the accompanying drawings in which:

FIG. 1 is a view of a mechanism for a single wiper blade constructed in accordance with the invention, but some of the parts omitted for clarity, FIG. 2 is an end view of the mechanism shown in FIG. 1, FIG. 3 is a small scale view of an alternative form of mechanism in accordance with the invention, FIG. 4 is a diagrammatic representation of areas of the vehicle windscreen which can be wiped by the mechanism shown in FIG. 3, FIG. 5 is a small scale diagrammatic view of an alternative form of apparatus, and FIG. 6 represents the areas wiped by the mechanism in FIG. 5.

With reference to the construction illustrated in FIGS. 1 and 2 the mechanism is intended to control a single wiper blade which is carried by a blade carrier 10. The blade carrier is pivotally mounted on one arm of a bell crank lever 11, the pivotal connection between the bell crank lever arm and the blade carrier being substantially parallel with the surface of a windscreen with which the mechanism is associated.

At the junction of its arms, the bell crank lever is pivotally mounted on a nut member 12 which has an internal pin (not shown) engaging in a continuous groove 13 in a cylindrical drive shaft 14. The continuous groove 13 is of double helical form, the helices being of opposite hand. At the ends of the helices there are portions 15 of the groove 13 which join the ends of the opposite helices.

In use, when the drive shaft 14 is rotated, the nut member 12 travels from end to the other of one of the helices and is then transferred by the appropriate groove portion 15 to the other helix, whereupon the nut member 12 moves back to said one end. This cycle is repeated continuously until the shaft 14 is brought to rest. To drive the shaft 14 there is an electric motor 16.

The nut 12 and bell crank lever 11 are connected to a flanged channel shaped part 17, which interengages with a T-shaped portion of a rail 18, which is thus of complementary cross-sectional shape to prevent tilting of the carrier and nut. The rail 18 is secured to a fixed part of the vehicle and extends substantially parallel with one edge (for example the lower edge) of the windscreen to be cleaned.

The rail 18 defines a channel 19 extending the full length thereof, which forms a guide for a roller 20 which is carried through a pin 21 on the other arm of the bell crank lever 11.

Over the greater part of its length, the channel 19 is parallel to the shaft 14, but at one of its ends there is an S-shaped extension of the channel indicated in FIG. 1 at 22.

The arrangement is such that the roller 20 engages in the extension 22 of the channel 19, before the nut member 17 has reached the end of its travel, and when the roller 20 moves into the extension 22, it is moved away from the longitudinal axis of the shaft 14, thus causing the bell crank lever 11 to pivot on the nut member 12.

In use, when the roller 20 is engaged in the portions of the channel 19 which extends parallel to the shaft 14, the blade carrier 10 is moved linearly so that the blade carried thereby is moved across the glass of the windscreen in a direction at right angles to the plane of the blade edge.

When the roller 20 reaches the extension 22 of the channel 19, however, the blade carrier 10 and blade are moved angularly so that the blade carrier out arcuate movement and finally reaches a position in which it is substantially parallel with the axis of the shaft 14. This represents the parked position of the blade.

In the example illustrated, the extension 22 of the channel has a portion at its end which is substantially parallel with the straight portion of the channel 19, but off-set therefrom. When the roller occupies this portion, the blade will occupy a position which is substantially parallel with the shaft axis and will be moved in that direction.

This portion of the extension 22 is necessary so that a second blade controlled by a similar mechanism, and moving in an arc which overlaps with the arc of the blade described, and in the parked position, will overlie it. If no such portion of the extension 22 is provided on one of the channels for the rollers 20 of the respective mechanisms, the blades will tend to interfere.

A preferred apparatus comprises two mechanisms operable in unison from a single drive shaft.

FIG. 4 represents a diagrammatic view of the portions of a windscreen which can be swept by means of blades operated by mechanisms, as described, each of the swept areas defining a rectangular portion and a quarter circular portion.

In FIG. 3 there is represented another mechanism which is capable of producing similar wiping cycle to the FIG. 4 representation. In FIG. 3 there are two pairs of pulleys 23, 24, 25, 26. The inner pair of pulleys 25, 26 are driven by a motor 27. Also engaging with each pair of pulleys is a cable 28, 29, carrying a blade carrier 30 and 31 respectively. Linear and angular movement of the blade carriers 30 and 31 is guided by the guide channel arrangement which is shown in the FIGS. 1 and 2 construction.

FIG. 6 represents wiped areas in an alternative arrangement in which the quarter circular portion in one area overlaps a part of the rectangular portion of the other area. A mechanism for producing such movement is shown in FIG. 5. This includes a pair of pulleys 32, 33 on which is mounted a cable. One of the pulleys is driven by a reversable drive mechanism. The cable carries a pair of blade carriers 34, 35, which are moved linearly along the cable upper reach. Mechanism (not shown) similar to the channel guide means of the FIG. 1 and 2 construction, is provided whereby the blade carriers 34 and 35, or parts connected thereto are moved angularly at the ends of the travel.

In an alternative arrangement the cables are replaced by metal strips running on pulleys.

In a further alternative arrangement there is a drive shaft similar to that illustrated in FIG. 1 having only one helical groove. The electric motor which drives the shaft is reversable and at the ends of the travel of the blade carrier the motor is reversed by appropriate switch mechanism.

Having thus described my invention what I claim as new and desire to secure by Letters Patent is:

1. A mechanism for controlling the operating cycle of a wiper blade for a vehicle windscreen comprising a wiper blade carrier, means for moving the carrier substantially linearly with respect to one edge of the windscreen to be cleaned, and guide means whereby said linear movement is converted into angular movement of the blade carrier over a portion of the cycle, the guide means comprising a member defining a channel extending lengthwise of the windscreen edge, said channel having, near one end, an off set extension, the carrier having an element engageable with the channel, whereby when the element reaches said off set extension, the blade carrier is caused to execute angular motion.

2. A mechanism as claimed in claim 1 in which the means for moving the carrier substantially linearly comprises a rotatable drive shaft formed with a continuous groove extending helically with respect to the axis of rotation of the shaft, the carrier having an element engageable with said groove so that as the shaft is rotated, the carrier moves lengthwise of the shaft.

3. A mechanism as claimed in claim 1 in which the extension of the channel is S-shaped.

4. A mechanism as claimed in claim 1 in which the member defining the channel is a rail having a portion interengaging with a formation on the blade carrier to prevent tilting of the carrier.

5. A mechanism as claimed in claim 1 in which there are two blade carriers operated by respective mechanisms from a single drive shaft.

6. A mechanism as claimed in claim 1 in which two blade carriers are connected to respective belts engaging pairs of pulleys respectively, the motion of the carriers being achieved by movement of the carriers with the belts between the pulleys, and linear and angular movement of the carriers being guided by guide channel means.

7. A mechanism as claimed in claim 1 in which the drive means comprises a belt or cable to which the blade carrier or more than one blade carrier is or are attached, the belt or cable being engaged on a pair of pulleys, one of which is driven in opposite directions alternately by a reversible drive mechanism.

* * * * *